H. B. KRAUT.
HAND SHEARING MACHINE.
APPLICATION FILED DEC. 30, 1910.

1,035,096.

Patented Aug. 6, 1912.
2 SHEETS—SHEET 1.

WITNESSES
Harry S. Gaither
William Goldberger

INVENTOR
Hans B. Kraut
by William H. Hall,
atty

H. B. KRAUT.
HAND SHEARING MACHINE.
APPLICATION FILED DEC. 30, 1910.
1,035,096.
Patented Aug. 6, 1912.
2 SHEETS—SHEET 2.
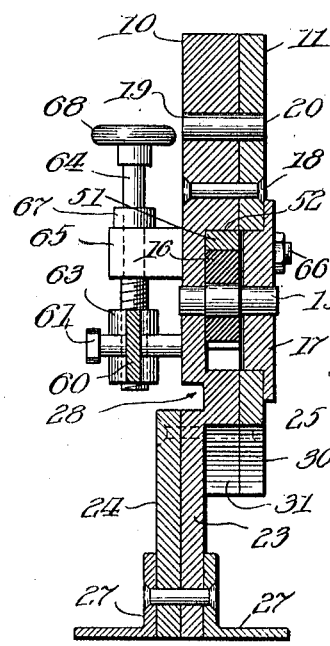
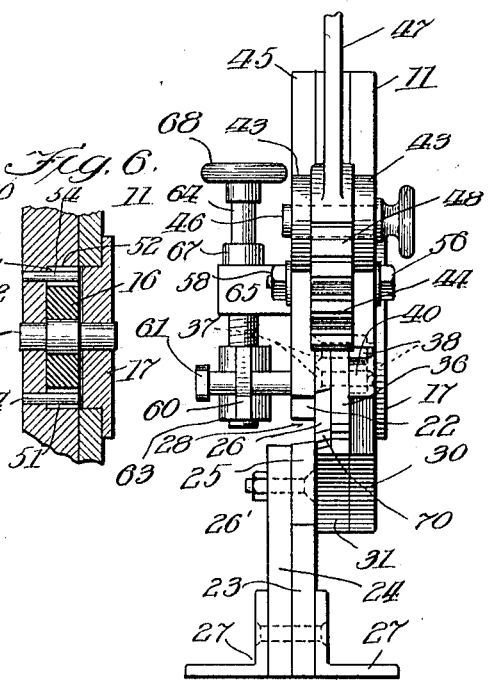
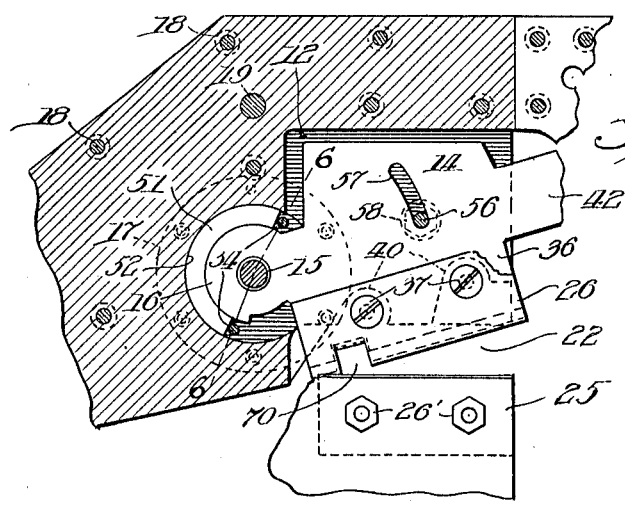
WITNESSES
Harry S. Gaither
William Goedberger.
INVENTOR
Hans B. Kraut
by William H. Hull
atty

UNITED STATES PATENT OFFICE.

HANS B. KRAUT, OF CHICAGO, ILLINOIS, ASSIGNOR TO JOSEPH T. RYERSON & SON, OF CHICAGO, ILLINOIS, A CORPORATION OF ILLINOIS.

HAND SHEARING-MACHINE.

1,035,096. Specification of Letters Patent. Patented Aug. 6, 1912.

Application filed December 30, 1910. Serial No. 600,026.

*To all whom it may concern:*

Be it known that I, HANS B. KRAUT, a citizen of the United States, and a resident of Chicago, in the county of Cook and State of Illinois, have invented certain new and useful Improvements in Hand Shearing-Machines; and I do hereby declare that the following is a full, clear, and exact description thereof, reference being had to the accompanying drawings, and to the characters of reference marked thereon, which form a part of this specification.

This invention relates to improvements in hand power shearing or punching machines, and the invention is herein shown as applied to a hand power plate shearing and bar cutting machine.

Among the objects of the invention is to provide an exceedingly strong, simple and durable frame for machines of this character which may be economically manufactured and readily assembled.

A further object of the invention is to provide a simple and readily accessible mounting for the swinging shear blade carrier, embracing a curved bearing block or member against which the heel or hub of the carrier bears when the shear is in action in a manner to avoid shearing stress on the pivot pin of the carrier, said block being arranged to be readily removable for replacement when worn.

A further object of the invention is to provide novel means for adjusting the swinging blade carrier toward and from the fixed blade to adapt the machine for cutting bars or for cutting plates.

A further object of the invention is to provide means for tying the two parts of the plate frame together at the point between which the movable blade carrier is guided in a manner to prevent the frame members from spreading apart, due to the side pressure of the shears when in action, the tying means extending through a suitably shaped opening in the movable blade carrier and piercing the frame plates and having clamping nuts at its ends to hold the frame members from separation.

Other objects of the invention are to provide other minor features of improvement in machines of this general type, and the invention consists in the matters hereinafter set forth and more particularly pointed out in the appended claims.

Figure 1:
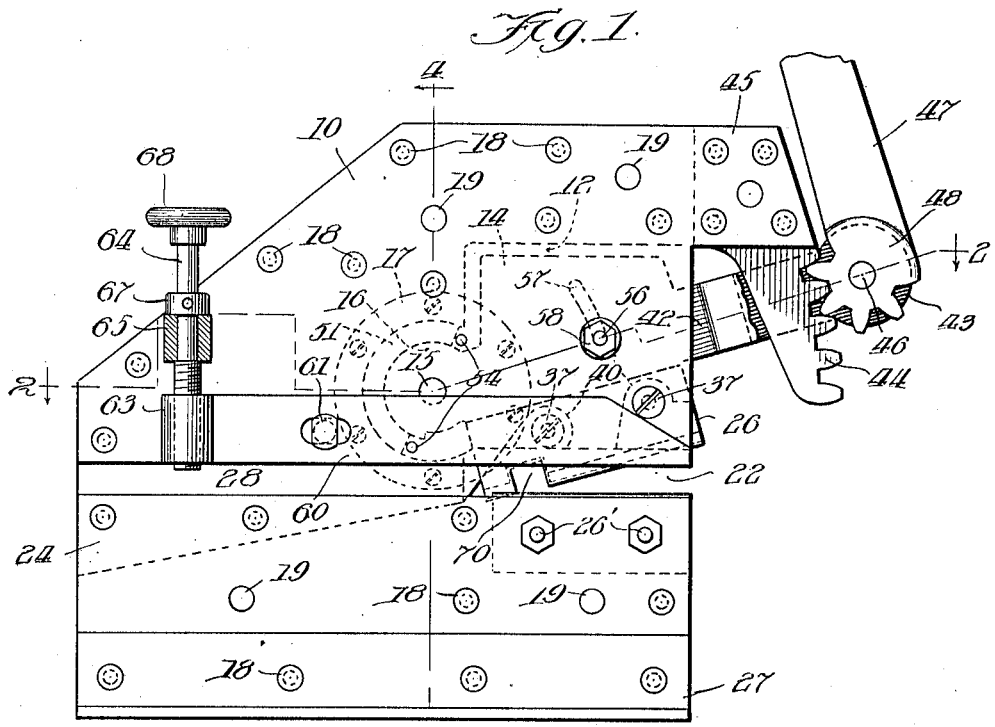
Figure 2:
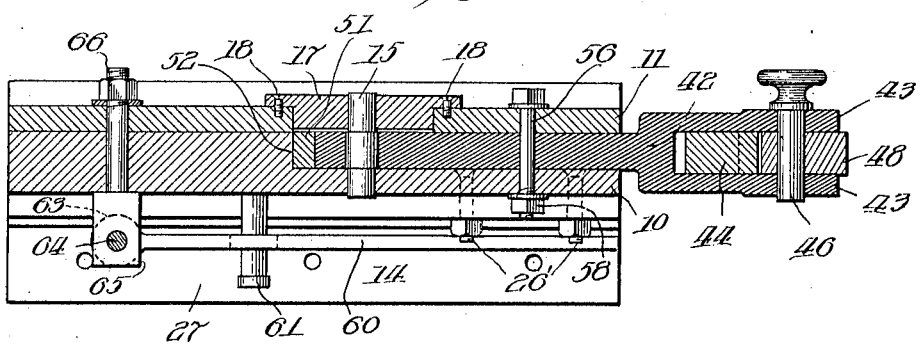

In the drawings,—Figure 1 is a side elevation of a shearing machine embodying my invention, with parts shown in section. Fig. 2 is a horizontal section on the indirect line 2—2 of Fig. 1. Fig. 3 is a front elevation of the machine. Fig. 4 is a vertical section on the line 4—4 of Fig. 1. Fig. 5 is a fragmentary detail section of the main frame plate taken in the plane of the plates to show more clearly the recessed or cut away space to provide a chamber for the swinging blade carrier. Fig. 6 is a detail section on the line 6—6 of Fig. 5.

The frame of the machine, as herein shown, embraces two plates 10 and 11, the former or the main plate extending from the base to the top of the machine, and the latter being of less depth and thinner than the main plate. The frame member 10 may be made of a sheet metal plate, recessed or cut away as hereinafter explained, or may be forged to the shape desired. Said frame member 10 is cut away on its inner side to provide a recess 12, best shown in Fig. 5, and indicated by the dotted outline in Fig. 1, to receive the swinging blade carrier 14, which latter is pivotally mounted on a pivot pin or stud 15 that extends through the apertured hub 16 at the rear end of the carrier and into apertures in the frame member 10 and in a flange plate 17 that is removably fitted in an opening in the frame member 11. The plate 11 is applied to the recessed side of the main plate 10 and constitutes one wall of the space or chamber for the swinging tool bearer, the thinner portion of the main plate 10 constituting the other wall of said chamber. The said frame members 10 and 11 are rigidly secured together by the rivets and pins 18, 19, respectively, the said pins being tightly driven into openings in the frame members in the same manner and for the same purpose as described in my co-pending application for United States Letters Patent, Serial Number 578,388, filed August 22, 1910. The said plates are cut inwardly at the front of the machine to provide a throat 22 beneath the shear carrier. The main plate or member 10 may be, and is herein shown as, recessed or worked out at its lower side at the right-hand side of the machine (Fig. 3), and the reduced part 23 of said main plate constitutes, together with the reinforcing plate 24, the base of the machine, the forward portions of which constitute the bolster to support the lower or fixed shear blade 25 which coöperates with the movable blade 26 that is attached to the swinging carrier 14, said lower blade being fixed to the bolster by the countersunk bolts 26' shown. Angle bars 27 riveted to said plates 23 and 24, constitute a suitably wide supporting base for the machine. The said main plate 10 is provided at the left hand side of the machine frame, and in line with the throat 22, with a horizontal, rearwardly extending groove 28 to constitute a guide for one part of a sheared plate which is being passed through the machine. The lower margin 30 of the frame plate 11 and the corresponding shouldered part 31 of the frame plate 10, above the lower cut away portion of the latter plate, are inclined downwardly and rearwardly from the rear side of the throat to the rear side of the machine, as shown in Fig. 3, and indicated in dotted lines in Fig. 1, to constitute a guide for the part of a plate at this side of the machine to separate or spread the parts of the plate at the sides of the cut for the proper action of the shearing blades thereon. The reinforcing plate 24 extends to the level of the lower wall of the groove 28 throughout the length of the machine frame, and thus overlaps, for a considerable part of the length of the frame, the lower oblique margin of the frame plate 11 to constitute in connection with the interposed lower side of the plate 10, an efficient joint between the top and bottom members of the frame.

The swinging carrier 14 for the upper shear blade 26 fits closely between and is guided in its movement by the plates 10 and 11. Said carrier is made of considerable depth between the plates in order to give proper steadying action to the carrier under stress of the shearing operations. The carrier is provided at its lower margin with an extension 36 to receive the upper shear blade 26, said blade being attached to said extension by means of the bolts 37 which have countersunk heads to engage countersunk recesses in the blade and are provided on their screw-threaded ends with the nuts 38 by which to clamp the blade on said extension. The frame plate 11 is cut away on its lower margin above the throat 23 to provide the recesses 40, indicated in dotted lines in Fig. 1, to receive said nuts when the swinging blade carrier occupies its uppermost position. The said blade carrier is provided beyond the frame plates with a forwardly extending bifurcated shank 42 the arms 43 of which extend on opposite sides of a curved, toothed rack 44 that is attached to and extends downwardly and forwardly from a forward extension 45 of the frame plate 11. The said bifurcated shank is provided with apertures to receive a pin 46 that constitutes a pivot for a hand lever 47 which is provided near its pivoted end with a mutilated gear 48 which meshes with the toothed rack 44. With the construction described, and with the parts in the position indicated in Fig. 1, when the hand lever 47 is depressed, the engagement of the teeth of the gear 48 with the rack 44 swings the outer end of the blade carrier downwardly to bring the upper blade into shearing engagement with the lower blade. The said hand lever 47 is normally rearwardly inclined from the vertical, as shown in Fig. 1, so as to normally hold the blade carrier in its uppermost position.

In order to relieve the pivot pin 15 from shearing stresses during the operation of the machine, whether it be a punching or shearing operation, I have provided a curved bearing plate or block 51 which is seated in a suitably shaped recess 52 at the rear end of the cut away portion 12 of the main plate of the machine frame, and is formed with an inner cylindric bearing surface, concentric to the axis of the pivot pin 15, adapted for bearing engagement with the cylindric hub 16 of the swinging blade carrier. The said curved bearing block 51 may be held removably in place in any suitable manner, as for instance, by means of small pins 54, 54, shown best in Figs. 5 and 6, which extend through the thinner portion of the main frame plate 10 and into the recess 52 and bear against the ends of the curved bearing block. The said curved bearing block 51 is arranged principally in rear of and above the pivot pin 15 so as to receive the upward thrust of the rear end of the swinging blade carrier when the outer end of said carrier is swung downwardly to bring the moving shear (or other tool) into coöperation with the fixed shear (or other tool). The means described for holding the bearing block in place permits ready removal and replacement of the bearing block, such removal and replacement being effected by removing the bearing plate 17 of the plate 11, thus freely exposing the bearing block and pins. The provision of said removable bearing block is an important feature of the construction described, (applicable to either a punching or shearing machine), inasmuch as it comprises means for relieving the pivot pin 15 of shearing stresses so that said pin may be made of conveniently small diameter; and furthermore the arrangement described enables the bearing block to be readily removed and replaced, at a small expense of time and labor.

In order to prevent the side thrust of the upper blade and its carrier from spreading or forcing outwardly the frame member, toward which the blade and its carrier tend to be thrust by reason of the shearing action of its blades, I may provide the tying bolt 56 which extends transversely through openings in the frame plates and through an arcuate opening or slot 57 in the upper blade carrier, which is disposed concentric to the pivot of the carrier and provide the screw-threaded end of the bolt with a clamping nut 58 adapted to bear on the outer face of the frame plate or upon a washer interposed between the frame plate and nut.

The machine is provided with a combined adjustable stripper and hold-down bar 60, arranged at the left hand side of the machine, as shown, with its forward end above the throat 22. Said combined stripper and hold-down bar is pivoted to the machine frame by the pivot stud 61 which extends laterally from the frame and engages an elongated opening in the bar. The rear end of the bar is provided with an enlargement 63 having a vertical screw-threaded opening to receive the lower, screw-threaded end of an adjusting screw 64 that is rotatively mounted in the enlarged end or head 65 of a stud 66 which extends through the machine frame, said stud fitting loosely in the frame to rotate about its axis. The adjusting screw shaft 64 is adapted to rotate in the head 65, and the parts are held from movement, in a direction endwise of the shaft, between the enlarged screw-threaded part of said shaft and a collar 67 pinned or otherwise suitably fixed to the shaft above said head 65. The shaft is provided at its upper end with a hand wheel 68 by which to rotate the same. By reason of the rotative engagement of the stud 66 in the frame, and of the slotted engagement of the stripper and hold-down bar with the stud 61, the said bar may be tilted about the stud 61 to swing its forward end toward or away from the work, or the bar may be adjusted laterally toward and from the throat, as desired. The stripper and hold-down bar acts to hold a piece of material, such as a round or square bar being cut, in a horizontal position and prevents the work from tilting during the cutting operation to insure a square cut, and also acts as a stripper, when the movable blade is being withdrawn, in the ordinary or usual manner of a stripper.

The upper shear blade is provided with a familiar form of notch 70, the upper side of which is formed with a shearing edge to coöperate with the lower blade for the purpose of shearing bars that are inserted into the notched portion of the upper blade, said notch preventing the bars slipping between the blades during the shearing operation. As shown in Fig. 1, the upper blade is adjusted for shearing bars, and in this position the notched portion of the upper blade is wholly above the fixed or lower blade when said upper blade occupies its uppermost position. Means are provided for adjusting the blade carrier toward and from the lower blade to adapt the machine to cut bars or to shear plates. In the adjustment of the carrier for shearing plates the cutting edge of the upper blade is lowered to bring the point of said edge just in front of the notch 70 below the upper edge of the fixed or stationary blade so that said point will not rise above the lower blade in the uppermost position of the upper blade and will not therefore tend to injure the plate being sheared, or will not itself be exposed to a breaking action on the plate. This adjustment may be variously effected. For instance, the pivot pin 46 by which the hand lever 47 is pivoted to the bifurcated shank of the upper blade carrier may be removable, so that the hand lever may be detached from said shank and engaged with a lower tooth of the rack 44, and again pivoted to said shank to thereby raise the upper blade carrier to the extent mentioned.

I claim as my invention:—

1. In a machine for the purpose set forth, the combination with a frame composed of two plates, namely a main plate cut away at its inner side between its margins to form a chamber to receive a tool carrier, and a plate fitted to the main plate over said cut-away portion and riveted thereto to constitute one wall of said chamber, said plates being rearwardly cut away in front of the machine below said chamber to provide a throat, of a tool carrier movable in said chamber having guiding engagement with the said plates, and means for actuating said tool carrier.

2. In a machine for the purpose set forth, the combination with a frame composed of two plates, one of which, the main plate, extends from the top to the base of the frame and cut away at its inner side between its margins to constitute a chamber to receive a tool carrier, and the other plate being applied and riveted to the main plate and extending across said chamber to form one wall thereof, said plates being cut away below said chamber to form a forwardly open throat, and the lower side of the main plate below said throat constituting a tool supporting bolster with a tool supported thereon, of a tool carrier movable in said chamber and having guiding engagement with said plates and adapted to carry a tool to coöperate with the bolster tool, and means for operating said carrier.

3. In a machine for the purpose set forth, the combination with a frame composed of two plates, one of which, the main plate, extends from the top to the base of the frame and cut away at its inner side between its margins to constitute a chamber to receive a shearing blade carrier, and the other plate being applied and riveted to the main plate and extending across said chamber to form one wall thereof, said plates being cut away to provide a forwardly opening throat below said chamber, the main plate being provided in line with the throat with a rearwardly extending exterior guide groove, and the lower side of the main plate constituting a bolster to support a fixed shear blade, of a movable shear blade carrier in said chamber and having guiding engagement with said plates, and provided with a shear to coöperate with said fixed blade, and means for operating said carrier.

4. In a machine for the purpose set forth, the combination with a frame composed of two plates, one of which, the main plate, extends from the top to the base of the frame and cut away at its inner side between its margins to constitute a chamber to receive a shearing blade carrier, and the other plate being applied and riveted to the main plate and extending across said chamber to form one wall thereof, and of a depth less than that of the main plate, said plates being cut away below said chamber to provide a forwardly opening throat, the main plate being provided on one side in line with the throat with an exterior, rearwardly extending guide groove and cut away at its other side to provide a downwardly facing guide surface extending rearwardly from the throat, and said main plate constituting below said guide groove a bolster to support a lower fixed shear, of a shear carrier movable in said chamber and provided with a shear to coöperate with the lower fixed shear, and means to operate said carrier.

5. In a machine for the purpose set forth, the combination with a frame composed of two plates, one of which, the main plate, extends from the top to the base of the frame and cut away at its inner side between its margins to constitute a chamber to receive a shearing blade carrier, and the other plate being applied and riveted to the main plate and extending across said chamber to form one wall thereof, and of a depth less than that of the main plate, said plates being cut away below said chamber to provide a forwardly opening throat, the main plate being provided on one side in line with the throat with an exterior, rearwardly extending guide groove and cut away at its other side to provide a downwardly facing guide surface extending rearwardly from the throat and the lower edge of the second or narrower frame plate being inclined coincident with the inclined guide surface of the main plate, the main plate constituting below said guide groove a bolster to support a lower fixed shear, and a reinforcing plate applied to the grooved face of the main plate and overlapping the lowermost inclined margin of the narrower frame plate, of a shear carrier movable in said chamber and provided with a shear to coöperate with the lower fixed shear, and means to operate said carrier.

6. In a machine for the purpose set forth, the combination with a frame composed of two plates, one of which is a main plate and extends from the top to the base of the frame and is recessed at its inner side between its margins to constitute a chamber for a tool carrier and the other of which is applied and fixed rigidly to the main plate over said chamber to constitute one wall thereof, the plates being cut away below said chamber to provide a forwardly opening throat and the lower part of the main plate below the throat constituting a bolster to support a fixed tool and a reinforcing plate applied to the base of the main plate on the side thereof opposite to the second frame plate and overlapping at its upper side the lower side of said second plate and riveted to both of said frame plates, of a tool carrier movable in said chamber provided with a tool to coöperate with the bolster tool, and means to operate said carrier.

7. In a machine for the purpose set forth, the combination with a frame consisting of side plates fixed rigidly together and having a tool carrier chamber between them and cut away below said chamber to constitute a forwardly opening throat, and provided below said throat with a tool supporting bolster, of a swinging tool carrier in said chamber pivotally mounted at its rear end on said plates and having guiding engagement with the plates, said carrier being provided with a shank which extends forwardly beyond the plates, and a hand device operatively connected to the shank for operating said carrier.

8. In a machine for the purpose set forth, the combination with a frame consisting of side plates fixed rigidly together and having a tool carrier chamber between them and cut away below said chamber to constitute a forwardly opening throat, and provided below said throat with a tool supporting bolster, of a swinging tool carrier in said chamber pivotally mounted at its rear end on said plates and having guiding engagement with the plates, said carrier being provided with a shank which extends forwardly beyond the plates, tying means extending between said plates through said chamber for tying the plates together, said carrier being provided with an opening for the passage of said tying means, and means for swinging said carrier on its pivot.

9. In a machine for the purpose set forth, the combination with a frame consisting of side plates fixed rigidly together and having a tool carrier chamber between them and cut away below said chamber to constitute a forwardly opening throat, and provided below said throat with a tool supporting bolster, of a swinging tool carrier in said chamber pivotally mounted at its rear end on said plates and having guiding engagement with the plates, said carrier being provided with a shank which extends forwardly beyond the plates, a hand lever pivoted to said carrier extension and provided at its pivoted end with a pinion, and a curved rack fixed to the frame adapted for meshing engagement with said pinion.

10. In a machine for the purpose set forth, the combination with a frame consisting of side plates fixed rigidly together and having a tool carrier chamber between them and cut away below said chamber to constitute a forwardly opening throat, and provided below said throat with a tool supporting bolster, of a swinging tool carrier in said chamber pivotally mounted at its rear end on said plates and having guiding engagement with the plates, said carrier being provided with a shank which extends forwardly beyond the plates, a hand lever pivoted to said carrier extension and provided at its pivoted end with a pinion, and a curved rack fixed to the frame adapted for meshing engagement with said pinion, said lever being detachable from the carrier extension, whereby its pinion may be adjusted to different teeth on the rack to thereby vary the effective throw of the tool carrier.

11. A machine for the purpose set forth, comprising a frame formed with a throat and provided below the throat with a bolster to support a fixed shearing blade, a blade fixed thereto, a swinging carrier pivoted to the frame and having guiding engagement therewith to move toward and from the fixed blade and provided with a blade to coöperate with said fixed blade, a hand lever pivoted to said carrier and provided with a pinion, a fixed carrier rack with which said pinion meshes, and means whereby the pinion is disengageable from the rack to adjust the same to various teeth of the rack and thereby adjust the carrier toward and from the fixed blade.

12. A machine for the purpose set forth, comprising a frame embracing separate frame members and provided with a tool support, with a fixed tool thereon, a swinging tool carrier pivoted by a pivot pin between the plates to swing toward and from the tool support and having a tool to coöperate with the fixed tool, and an abutment block having a curved bearing surface concentric to said pivot to engage a curved bearing on the carrier to receive the working thrust of the carrier and relieve the pivot pin of shearing stress due to such thrust.

13. A machine for the purpose set forth, comprising a frame embracing separate frame members and provided with a tool support, with a fixed tool thereon, a swinging tool carrier pivoted by a pivot pin between the plates to swing toward and from the tool support and having a tool to coöperate with the fixed tool, an abutment block having a curved bearing surface concentric to said pivot to engage a curved bearing on the carrier to receive the working thrust of the carrier and relieve the pivot pin of shearing stress due to such thrust, and means for removably mounting the thrust block in the frame, permitting its ready removal therefrom.

14. A machine for the purpose set forth, comprising a frame embracing separated frame members and provided with a tool support, with a fixed tool thereon, of a swinging tool carrier between the frame members, a pivot pin mounted in the frame members on which said carrier is pivoted, one of the frame members embracing a detachable member which carries one end of the pivot pin, an abutment block fixed to the frame to receive the working thrust of the carrier and relieve the pivot pin of shear stresses due to such thrust and means for removably mounting said block in the frame, said detachable member of the frame being arranged, when detached from the frame, to afford means for removing said block.

15. A machine for the purpose set forth, comprising a frame embracing separated frame members and provided with a tool support, with a fixed tool thereon, a swinging tool carrier between the frame members, a pivot pin mounted in the frame members on which said carrier is pivoted, a detachable plate constituting part of one of the frame members and arranged adjacent to the pivoted end of the carrier and having an opening to receive one end of the pivot pin, and an abutment block removably fixed in the frame to receive the working thrusts of the carrier, the said plate being of such diameter that when detached from the frame member an opening is provided in the frame members through which said abutment block may be removed.

16. A machine for the purpose set forth, comprising a frame embracing separated frame members and provided with a tool support, with a fixed tool thereon, a swinging tool carrier between the frame members, a pivot pin mounted in the frame members on which said carrier is pivoted, a detachable plate constituting part of one of the frame members and arranged adjacent to the pivoted end of the carrier and having an opening to receive one end of the pivot pin, a parti-cylindric abutment mounted in the frame and having a cylindric bearing surface to engage a cylindric bearing surface of the carrier to receive the working thrusts of the carrier, removable means engaging the ends of said block to removably hold the block in place, and a detachable plate constituting part of one frame member and having an opening to receive one end of said pin, said plate being made of such size that, when detached, an opening is provided through which to remove said abutment block.

17. The combination with a frame and a swinging tool carrier, having a pivot pin mounted in the frame, of a removable and renewable abutment block having a bearing surface concentric with said pivot pin to bear against a complemental bearing surface of the carrier to receive the working thrusts of the carrier and relieve the pivot pin of stress due to such thrusts.

18. In a shearing machine, the combination with a frame having a throat and the fixed and movable shear blades, of a combined hold-down and stripper bar arranged exterior to the frame at the throat, and vertical and horizontal pivots for said bar whereby the forward end of the bar may be adjusted both vertically and horizontally.

19. In a shearing machine, the combination with a frame having a throat and the fixed and movable shear blades, of a combined hold-down and stripper bar arranged exterior to the frame at the throat, a horizontal pivot stud on the frame engaging an elongated aperture in said bar, the rear end of the bar being provided with a vertical screw-threaded aperture, a screw-threaded adjusting shaft engaging said aperture to tilt the bar on its horizontal pivot, and a block loosely supported on the frame in which said adjusting shaft is rotatively mounted.

In testimony, that I claim the foregoing as my invention I affix my signature in the presence of two witnesses, this 21st day of December, A. D. 1910.

HANS B. KRAUT

Witnesses:
   W. L. HALL,
   WILLIAM GOLDBERGER.

---

Copies of this patent may be obtained for five cents each, by addressing the "Commissioner of Patents, Washington, D. C."